UNITED STATES PATENT OFFICE.

HERBERT GORKE, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

BROWN BASIC AZO DYE.

999,713. Specification of Letters Patent. Patented Aug. 1, 1911.

No Drawing. Application filed April 1, 1911. Serial No. 618,394.

*To all whom it may concern:*

Be it known that I, HERBERT GORKE, doctor of philosophy, chemist, citizen of the German Empire, residing at Leverkusen, near Cologne, Germany, have invented new and useful Improvements in Brown Basic Azo Dyes, of which the following is a specification.

Basic azo dyestuffs prepared from triaminodiphenyl e. g.

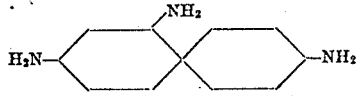

have not yet been described and used.

I have discovered that a new class of basic azodyestuffs can be obtained from triaminodiphenyl which dyestuffs contain this compound as middle component. These new dyestuffs are distinguished by the valuable property of being capable of dyeing artificial silk (Chardonnet-silk, Glanzstoff) etc. directly in shades fast to water.

The new process for the manufacture of these dyestuffs consists in combining diazotized amins or acyldiamins with triaminodiphenyl, tetrazotizing the monoazo dyestuffs thus obtained or hexazotizing the products obtained from acidyldiamins after elimination of the acidyl group and finally combining the tetrazo- or hexazo- compounds thus produced either with the same or with mixtures of suitable amins, diamins, naphthylenediamins, aminonaphthols, or alkyl derivatives of these compounds.

In order to illustrate the new process more fully the following examples are given, the parts being by weight:

Example 1: 151 parts of para-aminobenzyldimethylamin are diazotized in the usual manner and added at 0-5° to a solution of 310 parts of 2.4.4¹-triaminodiphenylhydrochlorid in 3000 parts of water. The free acid is neutralized with soda and the mixture is after half an hour acidulated with 700 parts of hydrochloric acid. The monoazo dyestuff is then tetrazotized with 138 parts of sodium nitrite. Subsequently 250 parts of 2.4-toluylenediamin are added to the tetrazo compound and the mixture is after neutralization of the free acid with soda, stirred for some hours. It is again acidulated and the dyestuff is filtered off and dried. It dyes artificial silk in brown shades.

Example 2: 150 parts of acetyl-paraphenylenediamin are diazotized and combined with 310 parts of triaminodiphenyl, as described in Example 1. The monoazo dyestuff thus obtained is tetrazotized and combined with 220 parts of meta-phenylenediamin in soda alkalin solution. After the addition of 1500 parts of hydrochloric acid the product of the reaction is boiled for from one to two hours. The solution is then cooled and the dyestuff is filtered off and dried. It dyes artificial silk in brown shades.

Example 3: 150 parts of acetyl-paraphenylenediamin are diazotized and the diazo derivative is combined with 310 parts of triaminodiphenyl as is described in Example 1. 1000 parts of hydrochloric acid are added to the monoazo dyestuff thus obtained and the mixture is boiled for one hour. When the solution has cooled the resulting azo dyestuff is hexazotized with 207 parts of sodium nitrite (3 molecules) and combined with 366 parts of toluylendiamin (3 molecules) in soda alkalin solution. After acidulation with hydrochloric acid the dyestuff is filtered off and dried. It dyes artificial silk in brownish-black shades. The dyes are after being dried and pulverized dark powders soluble in water with a brown coloration and soluble in concentrated sulfuric acid with a black coloration; yielding upon treatment with stannous chlorid and hydrochloric acid tetraaminodiphenyl. The process is carried out in a similar manner by using other amins or other of the above mentioned end components.

I claim:

The herein described new basic azo dyes obtainable from triaminodiphenyl, which dyes are after being dried and pulverized dark powders soluble in water with a brown coloration and soluble in concentrated sulfuric acid with a black coloration; yielding upon treatment with stannous clorid and hydrochloric acid tetraaminodiphenyl; and dyeing artificial silk directly brown shades fast to water, substantially as described.

In testimony whereof I have hereunto set my hand in the presence of two subscribing witnesses.

HERBERT GORKE. [L. S.]

Witnesses:
　CHAS. J. WRIGHT,
　ALFRED HENKEL.